United States Patent
Mai et al.

(10) Patent No.: US 10,954,069 B1
(45) Date of Patent: Mar. 23, 2021

(54) GRAVITY-DRIVEN TIRE DELIVERY APPARATUSES AND METHODS OF TIRE DELIVERY

(71) Applicant: Toyota Motor Engineering & Manufacturing North America, Inc., Plano, TX (US)

(72) Inventors: Lieu X. Mai, San Antonio, TX (US); Frederick P. Matthews, San Antonio, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/578,537

(22) Filed: Sep. 23, 2019

(51) Int. Cl.
*B65G 11/14* (2006.01)
*B65G 11/20* (2006.01)

(52) U.S. Cl.
CPC .......... *B65G 11/143* (2013.01); *B65G 11/203* (2013.01)

(58) Field of Classification Search
CPC ..... B65G 11/20; B65G 11/203; B65G 11/085; B65G 11/086; B65G 11/088; B65G 11/143
See application file for complete search history.

(56) References Cited

U.S. PATENT DOCUMENTS

| | | | | |
|---|---|---|---|---|
| 2,693,264 A | * | 11/1954 | Waterbury | A01D 46/243 193/7 |
| 2,890,780 A | * | 6/1959 | Schuricht | B65G 11/086 193/27 |
| 3,005,531 A | * | 10/1961 | Scaramuzzi | B65G 11/086 193/27 |
| 3,565,225 A | * | 2/1971 | Fay | A01D 46/243 193/7 |
| 4,273,253 A | * | 6/1981 | Tanaka | B65G 11/203 221/75 |
| 4,285,425 A | * | 8/1981 | Smith | B65G 11/088 141/392 |
| 7,931,138 B2 | | 4/2011 | Kim | |
| 2005/0091957 A1 | * | 5/2005 | Stanners | A01D 46/20 56/328.1 |

FOREIGN PATENT DOCUMENTS

| | | |
|---|---|---|
| CN | 102303658 B | 11/2012 |
| JP | 2014125150 A | 7/2014 |
| KR | 20050120995 A | 12/2005 |
| KR | 100792943 B1 | 1/2008 |
| KR | 101188587 B1 | 10/2012 |

* cited by examiner

*Primary Examiner* — William R Harp
(74) *Attorney, Agent, or Firm* — Dinsmore & Shohl LLP

(57) ABSTRACT

A gravity-driven tire delivery apparatus includes a base and a tire delivery chute that extends vertically from the base. The tire delivery chute includes a wall including a braking projection mounted to the wall that extends into a travel path of a tire through the tire delivery chute. The braking projection is sized to allow the tire to pass by the braking projection once the tire is moved laterally by the braking projection.

17 Claims, 7 Drawing Sheets

GRAVITY-DRIVEN TIRE DELIVERY APPARATUSES AND METHODS OF TIRE DELIVERY

TECHNICAL FIELD

The present specification generally relates to tire delivery apparatuses and associated methods, and more specifically, gravity-driven tire delivery apparatuses that are used to guide tires vertically to a tire delivery device.

BACKGROUND

During vehicle manufacturing, tires may be delivered to an assembly line from a storage location. In some instances, the storage locations may be elevated. To ease an ergonomic burden on assembly personnel, powered elevators may be used to lift tires to the storage location and to lower tires from the storage location during the assembly process. However, the powered elevators may malfunction, which can increase the ergonomic burden on the assembly personnel. Other tire delivery apparatuses are desired that can be used to deliver tires stored at an elevated position relative to an assembly location.

SUMMARY

In one embodiment, a gravity-powered tire delivery apparatus includes a base and a tire delivery chute that extends vertically from the base. The tire delivery chute includes a wall including a braking projection mounted to the wall that extends into a travel path of a tire through the tire delivery chute. The braking projection is sized to allow the tire to pass by the braking projection once the tire is moved laterally by the braking projection.

In another embodiment, a method of delivering a tire from an elevated storage location to an assembly location is provided. The method includes manually dropping a tire into an open top of a tire delivery chute that extends vertically from a base. The tire delivery chute includes a wall that includes a braking projection mounted to the wall that extends into a travel path of the tire through the tire delivery chute. The braking projection is sized to allow the tire to pass by the braking projection once the tire is moved laterally by the braking projection. The tire is removed from the tire delivery chute.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to gravity-powered tire delivery apparatuses for delivering tires vertically from an elevated storage location to a tire delivery device. The tire delivery apparatuses include a vertically-oriented tire delivery chute that is sized to receive individual tires, one-by-one. The tire delivery chute includes a vertical front wall, a vertical back wall and vertical side walls that extend between the vertical front wall and the vertical back wall. In order to reduce a footprint of the delivery chute, it may be oriented vertically with a central delivery axis substantially parallel to vertical. The tire delivery chute includes a plurality of braking projections that extend out into a travel path of the tires as they travel through the delivery chute. The braking projections contact the tires as they travel through the delivery chute and slow the fall of the tires. A tire delivery device is provided in the chute that receives the falling tire. The tire delivery device can be moved laterally from a catch position to a delivery position to present the tires for assembly.

Figure 1:
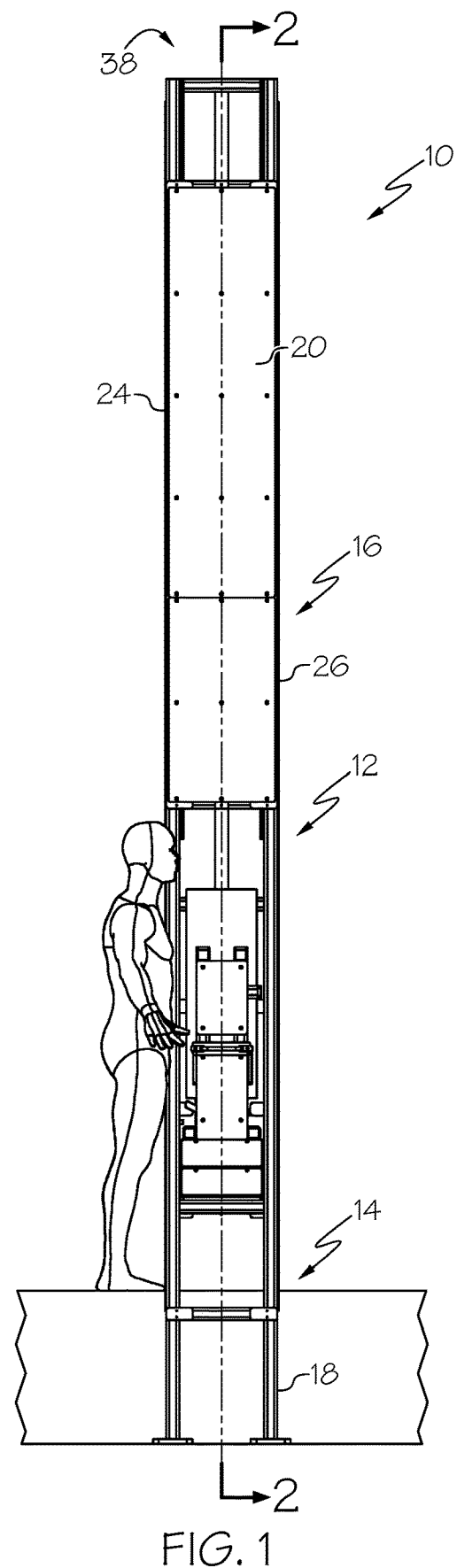
FIG. 1 is a front view of a tire delivery apparatus, according to one or more embodiments shown and described herein.
Figure 2:
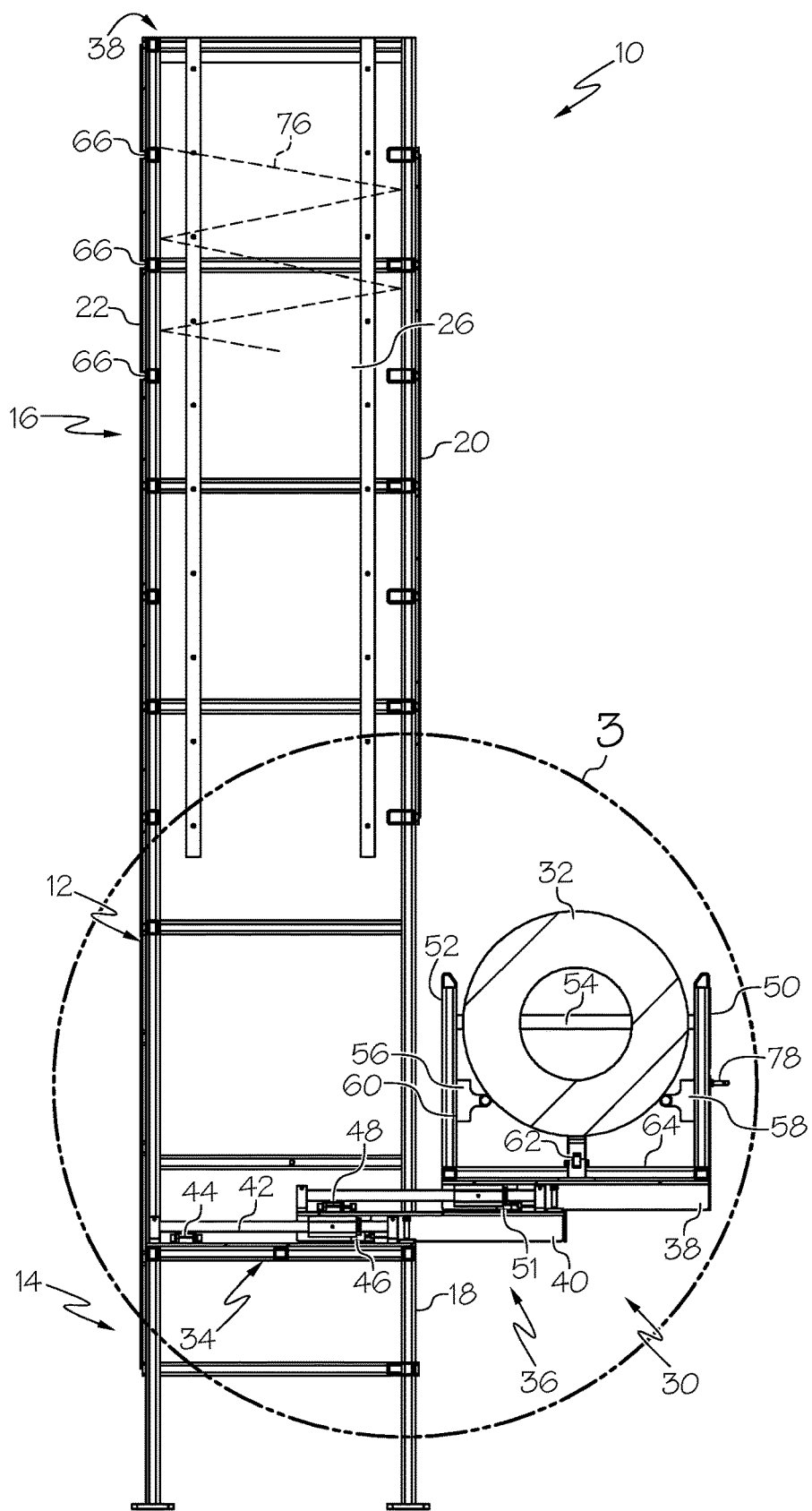
FIG. 2 is a section view of the tire delivery apparatus along line 2-2 of FIG. 1, according to one or more embodiments shown and described herein.

Referring to FIGS. 1 and 2, a gravity-powered tire delivery apparatus 10 generally includes a frame 12 that forms a base 14 and a tire delivery chute 16 that extends vertically upward from the base 14. The frame 12 is generally formed of four corner beams 18 that extend vertically a height of both the base 14 and the tire delivery chute 16. The tire delivery chute 16 may be further formed of a front wall 20, a rear wall 22 and side walls 24 and 26 that extend between the front wall 20 and the rear wall 22 forming an elongated box shape. The cross-sectional size of the box shape is selected to inhibit turning of the tires as they travel from an open top 38 down the tire delivery chute 16.

Figure 3:
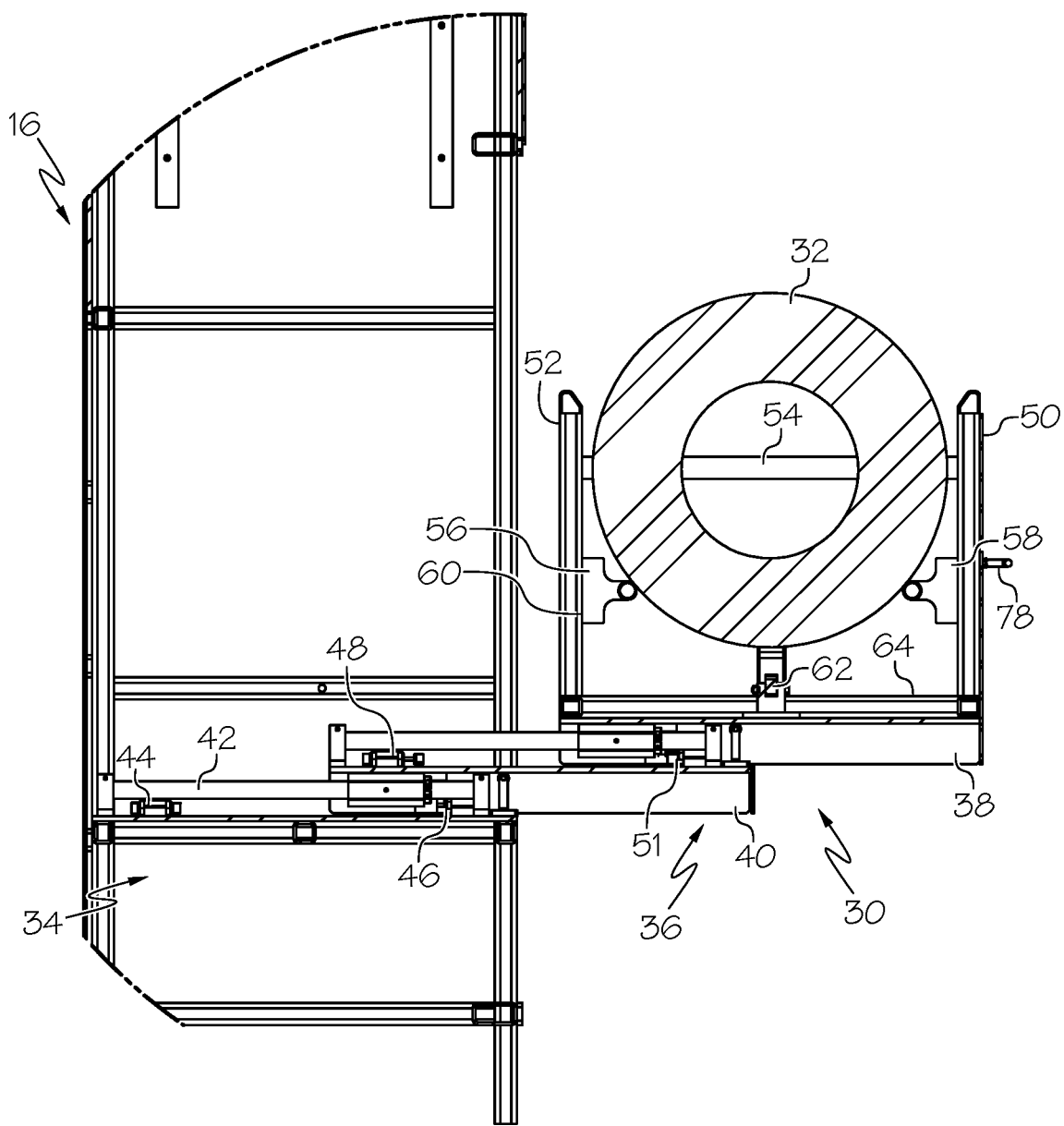
FIG. 3 is a detail view of the tire delivery apparatus of FIG. 2 within area 3, according to one or more embodiments shown and described herein.

Referring to FIGS. 2 and 3, the tire delivery apparatus 10 further includes a tire delivery device 30 that catches a tire 32 at a bottom 34 of the tire delivery chute 16. The tire delivery device 30 includes a telescoping support 36 that includes a first arm 38 that supports the tire 32 thereon, a second arm 40 that slidably supports the first arm 38 and a third arm 42 that is fixed to the frame 12 and slidably supports the second arm 40 such that the tire delivery device 30 can move laterally from a catch position located within the tire delivery chute 16 to a delivery position outside the tire delivery chute 16 to present the tires for assembly. In some embodiments, shock absorbers 44 and 46 may be located between the second and third arms 40 and 42 and shock absorbers 48 and 51 may be located between the first and second arms 38 and 40. The shock absorbers 44, 46, 48 and 51 may be formed using, for example, springs, rubber or other resilient materials to reduce a shock to the tire delivery device 30 when catching the tire 32 that falls through the tire delivery chute 16.

The tire delivery device 30 may further include a front wall 50, a rear wall 52 and side braces 54 that extend between the front wall 50 and the rear wall 52. Tire supports 56 and 58 may extend inwardly from the front wall 50 and the rear wall 52 that are sized to support the tire 32 therebetween with the tire 32 in an upright, standing position. The tire supports 56 may each have a base 60 that is mounted to inside surfaces of the front wall 50 and the rear wall 52. Another tire support 62 may be mounted to a bottom wall 64.

Figure 4:
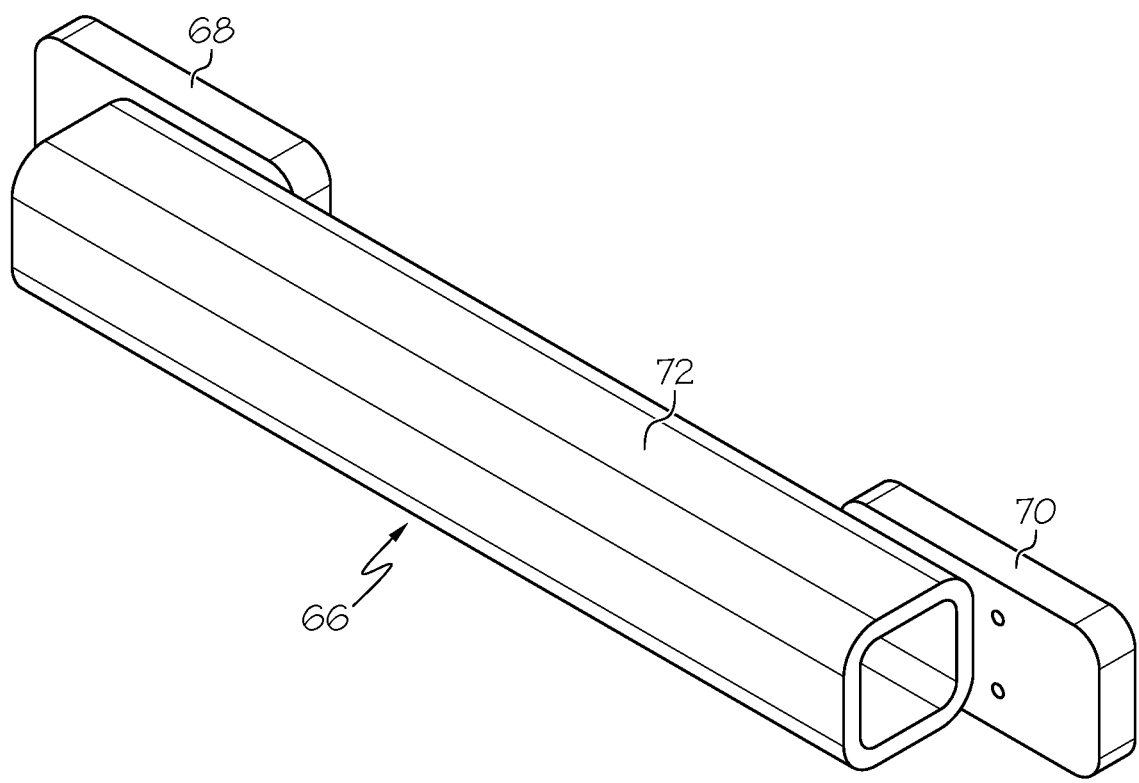
FIG. 4 is a perspective view of a braking projection of the tire delivery apparatus of FIG. 1, according to one or more embodiments shown and described herein.

Referring again to FIG. 2, the rear wall 22 has an array of braking projections 66 mounted thereto. Referring briefly to FIG. 4, the braking projections 66 may be beams that are mounted to mounts 68 and 70 that mount to the rear wall 22. The braking projections 66 may have corners 72 that are rounded to present rounded surfaces to the tire 32 as it impacts against the braking projections 66. Referring back to FIG. 2, the braking projections 66 are spaced vertically from one another and arranged along a height of the rear wall 22. The braking projections 66 extend outwardly into the tire delivery chute 16 a distance sufficient to interrupt the falling of the tire 32, but also to allow the tire 32 to pass by in a somewhat zig-zag motion (represented partially by dashed line 76). The braking projections 66 force the tire 32 to move laterally, which can slow down the fall of the tire 32 through the tire delivery chute 16 until the tire 32 reaches the tire delivery device 30 with the tire delivery device 30 in the closed position. The tire delivery device 30 may then be moved to the illustrated open position. In some embodiments, a handle 78 may be provided that facilitates grasping and opening the tire delivery device 30.

Figure 5:
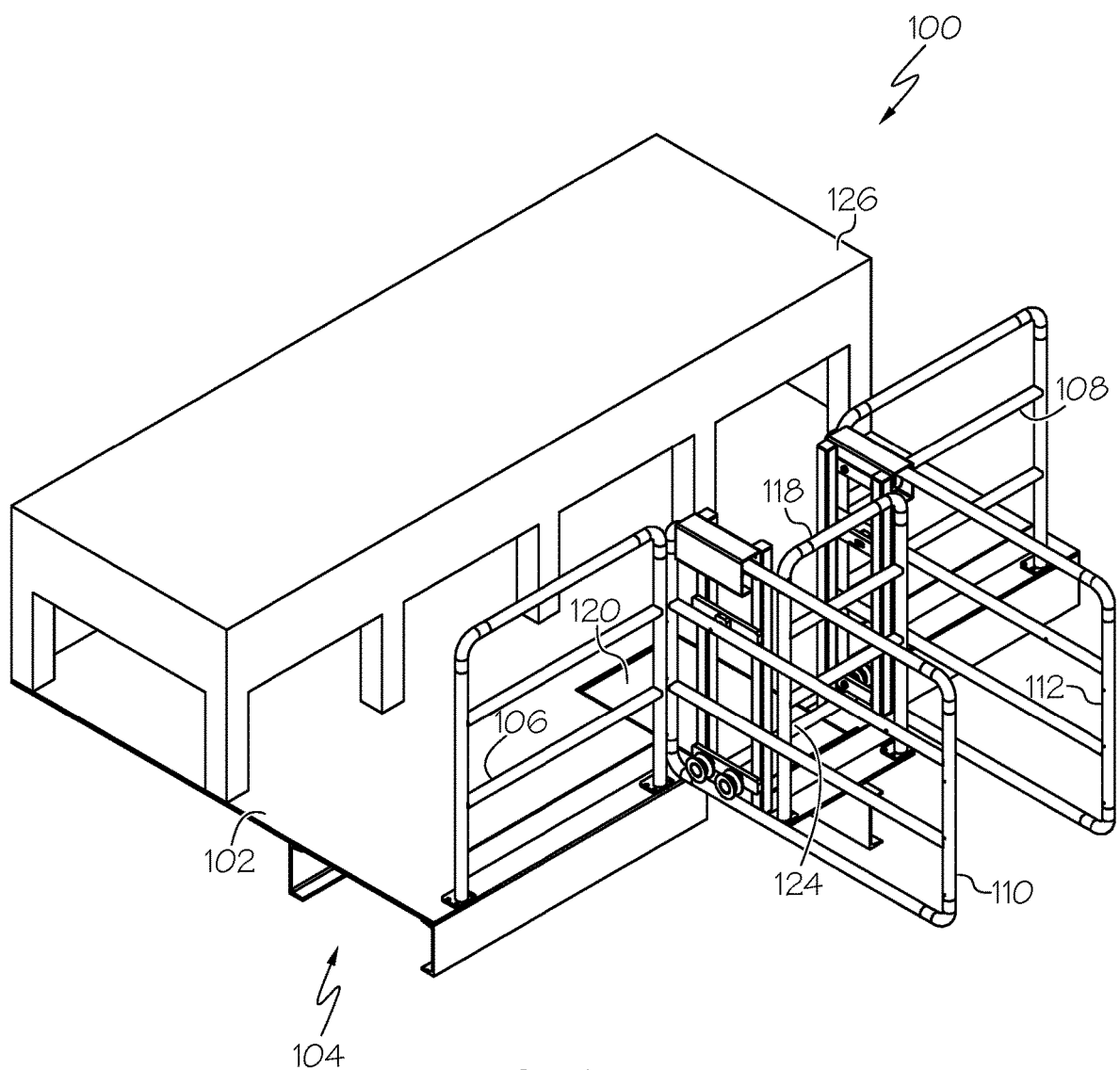
FIG. 5 is a perspective view of a tire intake system for use with the tire delivery apparatus of FIG. 1 in a closed configuration, according to one or more embodiments shown and described herein.

Referring to FIG. 5, the tire delivery chute 16 of the tire delivery apparatus 10 may be connected to an overhead walkway (e.g., catwalk) using a tire intake system 100. The tire intake system 100 may include a base platform 102 that has a connector 104 that connects to a beam to locate the tire intake system 100 at the overhead walkway. Fixed gates 106 and 108 are fixedly mounted to the base platform 102. A pair of sliding gates 110 and 112 are slidably connected to the fixed gates 106 and 108 at brackets 114 and 116 that allow the sliding gates 110 and 112 to slide between closed (FIG. 5) and open (FIG. 6) configurations. Another fixed gate 118 is fixedly mounted to the base platform 102 and provides a barrier adjacent a trap door 120. The trap door 120 covers an open top 38 to the tire delivery chute 16 (FIG. 1). A crossbar 124 is mounted to the sliding gates 110 and 112. The crossbar 124 blocks the trap door 120 from opening when the sliding gates 110 and 112 are in the closed configuration.

Figure 6:
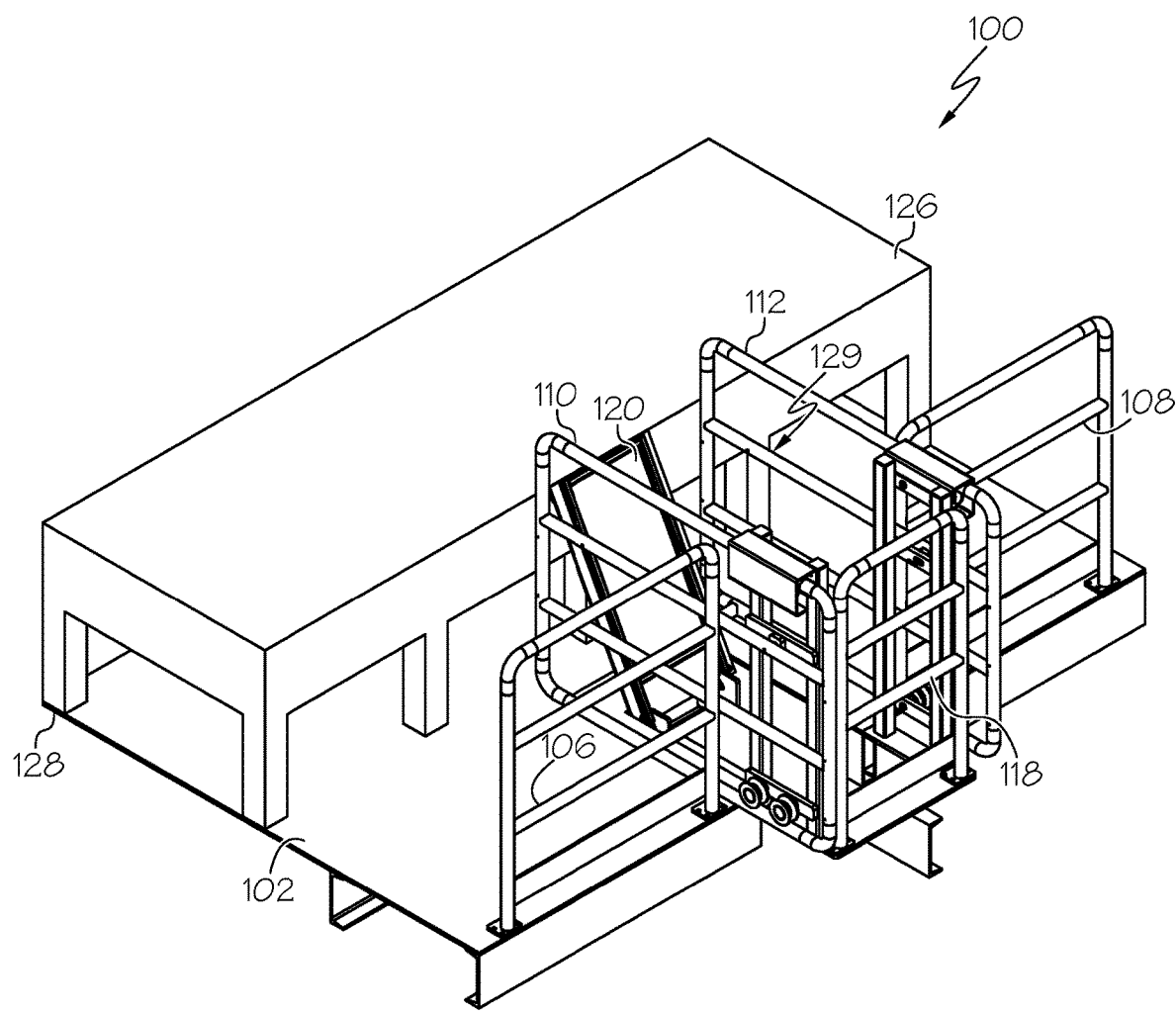
FIG. 6 is a perspective view of the tire intake system of FIG. 5 in an open configuration, according to one or more embodiments shown and described herein.

FIG. 6 illustrates the tire intake system 100 in the open configuration. In the open configuration, the sliding gates 110 and 112 are moved against an edge barrier 126 that extends along an outer edge 128 of the base platform 102. As can be seen, the fixed gates 106, 108 and 118 remain fixed and do not move with the sliding gates 110 and 112. Moving the sliding gates 110 and 112 into the open configuration moves the crossbar 124 out of the way of the trap door 120 thereby allowing the trap door 120 to be placed in an open position, as shown. The gates 106, 108, 110, 112 and 118 and edge barrier 126 together provide an enclosure 129 that surrounds the open top 38 to the tire delivery chute 16 that is sized to receive the tire in an upright, standing orientation.

Figure 7:
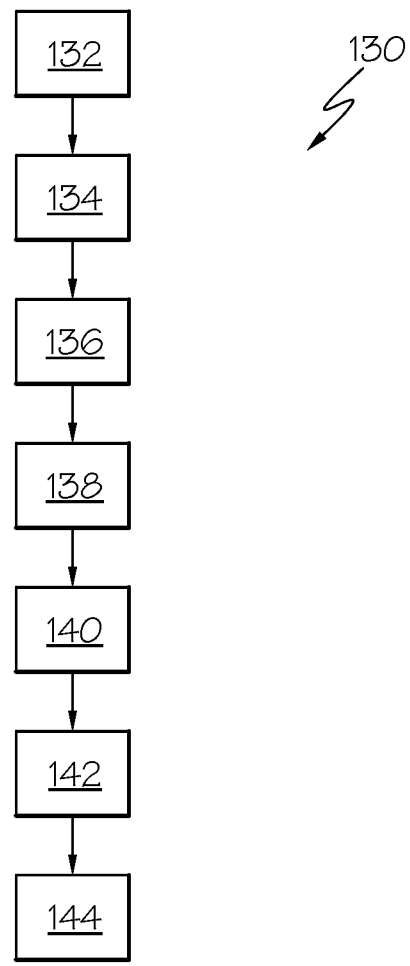
FIG. 7 is a method of using the tire delivery apparatus of FIG. 1, according to one or more embodiments shown and described herein.

Referring to FIG. 7, a method 130 of delivering a tire from an elevated storage position to an assembly location using the tire delivery apparatus is shown. At step 132, the tire intake system is placed in the open configuration by sliding the sliding gates to their open position thereby unlocking the trap door. With the crossbar removed from the trap door, the trap door can be opened at step 134 thereby exposing the opening of the tire delivery chute. A tire may then be placed within the enclosure and inserted through the opening in the tire delivery chute at step 136. At step 138, the tire, under the influence of gravity, descends through the tire delivery chute. Due to the size and locations of the braking projections, the tire bounces off one or more of the braking projections and moves laterally, which serves to slow the speed of the tire through the chute at step 140. At step 142, the tire is received within the tire delivery device. At step 144, the tire delivery device is moved manually from the closed position within the tire delivery chute to the open position outside the tire delivery chute.

The above-described tire delivery apparatuses provide for vertical tire delivery between an elevated storage position and an assembly location below the elevated storage position in a reliable fashion without use of electrical power. The tire delivery apparatuses allow the tires to fall through a tire delivery chute while contacting and bouncing laterally from braking projections that are only partially within a travel path of the tires. The tire is received by a tire delivery device that moves from a closed position to an open position. In the open position the tire delivery device presents the tire in an upright, standing configuration for assembling to a vehicle. A tire intake system may be provided that has a closed configuration that closes off and locks a trap door to the tire delivery chute and an open configuration that unlocks the trap door and allows the trap door to be opened to expose the tire delivery chute.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gravity-driven tire delivery apparatus comprising:
   a base;
   a tire delivery chute that extends vertically from the base, the tire delivery chute comprising a wall comprising a braking projection mounted to the wall that extends into a travel path of a tire through the tire delivery chute, the braking projection is sized to allow the tire to pass by the braking projection once the tire is moved laterally by the braking projection; and
   a tire intake system comprising sliding gates that extend along opposite sides of a trap door that covers an open top of the tire delivery chute, the sliding gates connected by a crossbar that blocks the trap door from opening with the sliding gates in a closed configuration.

2. The tire delivery apparatus of claim 1 further comprising a tire delivery device located at a bottom of the tire delivery chute, the tire delivery device configured to receive the tire at the bottom of the tire delivery chute.

3. The tire delivery apparatus of claim 2, wherein the tire delivery device moves between a closed position within the tire delivery chute to an open position located outside the tire delivery chute.

4. The tire delivery apparatus of claim 3, wherein the tire delivery device comprises first telescoping arm and a second telescoping arm, the first telescoping arm sliding relative to the second telescoping arm.

5. The tire delivery apparatus of claim 1 comprising an array of braking projections mounted to the wall of the tire delivery chute, the array of braking projections being spaced vertically along a height of the wall of the tire delivery chute.

6. The tire delivery apparatus of claim 1 comprising a frame comprising four corner beams that extend a height of both the base and the tire delivery chute.

7. The tire delivery apparatus of claim 1, wherein the tire delivery chute comprises a front wall, a rear wall and side walls extending between the front wall and the rear wall forming an elongated box shape.

8. The tire delivery apparatus of claim 7, wherein a cross-sectional size of the tire delivery chute is selected to inhibit turning of the tire as the tire travels though the tire delivery chute.

9. The tire delivery apparatus of claim 1, wherein the tire intake system connects the tire delivery chute to an overhead walkway.

10. A method of delivering a tire from an elevated storage location to an assembly location, the method comprising:
opening a trap door of a tire intake system comprising sliding gates that extend along opposite sides of the trap door that covers an open top of the a delivery chute, the sliding gates connected by a crossbar blocking the trap door from opening with the sliding gates in a closed configuration;
manually dropping a tire into the open top of the tire delivery chute that extends vertically from a base, the tire delivery chute comprising a wall comprising a braking projection mounted to the wall that extends into a travel path of the tire through the tire delivery chute, the braking projection is sized to allow the tire to pass by the braking projection once the tire is moved laterally by the braking projection; and
removing the tire from the tire delivery chute.

11. The method of claim 10 further comprising a tire delivery device located at a bottom of the tire delivery chute, the tire delivery device configured to receive the tire at the bottom of the tire delivery chute.

12. The method of claim 11 comprising moving the tire delivery device between a closed position within the tire delivery chute to an open position located outside the tire delivery chute.

13. The method of claim 12, wherein the tire delivery device comprises first telescoping arm and a second telescoping arm, the first telescoping arm sliding relative to the second telescoping arm.

14. The method of claim 10 comprising an array of braking projections mounted to the wall of the tire delivery chute, the array of braking projections being spaced vertically along a height of the wall of the tire delivery chute.

15. The method of claim 10 comprising a frame comprising four corner beams that extend a height of both the base and the tire delivery chute.

16. The method of claim 10, wherein the tire delivery chute comprises a front wall, a rear wall and side walls extending between the front wall and the rear wall forming an elongated box shape.

17. The method of claim 16 further comprising inhibiting turning of the tire as the tire travels though the tire delivery chute.

\* \* \* \* \*